June 3, 1969
P. O. HAGARMAN
3,447,967
SILVER-ZINC OR CADMIUM TYPE BATTERY WITH
WIRE MESH SCREEN ELECTRODE
Filed Jan. 3, 1967
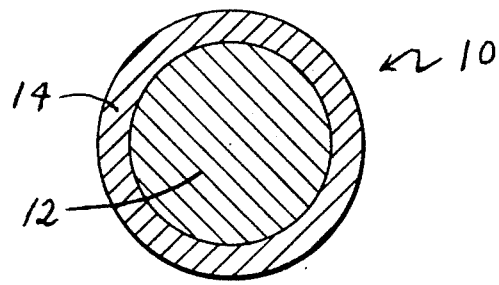
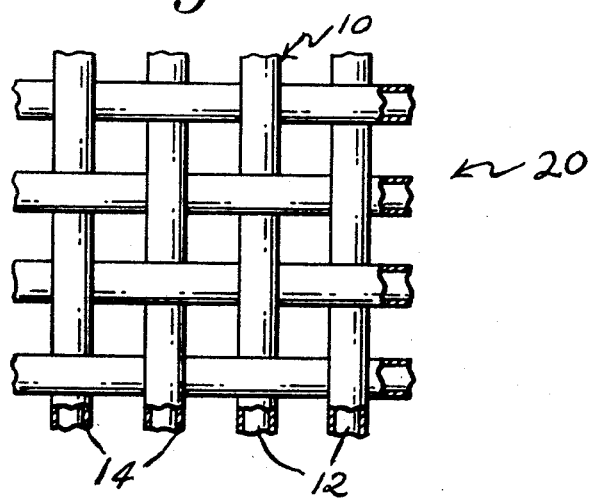
INVENTOR,
PAUL O. HAGARMAN,
BY
Edward J Emmons
ATT'Y.

3,447,967
SILVER-ZINC OR CADMIUM TYPE BATTERY
WITH WIRE MESH SCREEN ELECTRODE
Paul O. Hagarman, North Attleboro, Mass., assignor to Texas Instruments Incorporated, Dallas, Tex., a corporation of Delaware
Filed Jan. 3, 1967, Ser. No. 606,620
Int. Cl. H01m 43/02
U.S. Cl. 136—6     3 Claims

ABSTRACT OF THE DISCLOSURE

A silver-zinc or silver-cadmium battery including a wire-mesh screen electrode having a metal and metal oxide layers.

---

This invention relates to composite materials and more particularly to an improved material for use as a support for the silver anode in a silver-zinc, silver-cadmium or like battery system.

In batteries of the alkaline type which use a silver anode such as silver cadminum or silver zinc system, it is common to employ a solid silver screen or expanded metal structure on which is deposited a silver oxide which functions as the active material in the battery. The silver support does not enter into the battery reaction, but is employed because silver oxide adheres readily to silver.

The silver is chosen because it will not contaminate the system or disturb the battery life or power by entering into the battery reaction. Other materials are unsuited since they either do not have the adhering quality of silver or they would contaminate the battery.

A drawback to silver is its high cost as a precious metal, and its decreasing supply in the world.

It is an object of this invention to provide an improved material for use in the support screen used in the anode in alkaline silver zinc, silver cadmium and like batteries, which has the inertness of silver and its adhering qualities but which is stronger and lower in cost.

Other objects will be in part apparent and in part pointed out hereinafter.

The invention accordingly comprises the elements and combinations of elements, features of construction and arrangements of parts all of which will be exemplified in the structure hereinafter described and the scope of the application of which will be indicated in the appended claims.

In the accompanying drawings in which one of various possible embodiments of the invention is illustrated:

FIG. 1 is a section through a composite strand according to this invention and

FIG. 2 is a plan view of a wire screen electrode support according to the instant invention.

Similar reference characters indicate the corresponding parts throughout the several views of the drawings. Dimensions of certain of the parts as shown in the accompanying drawings have been modified for the purposes of clarity of illustration.

Turning now to the drawings particularly FIG. 1 there is shown a composite material according to the instant invention generally indicated by reference numeral 10 and formed of an inner strand like core of nickel 12 and an outer layer or cladding 14 of silver.

A typical support screen formed from the material 10 is shown in FIG. 2 and generally indicated at numeral 20. It is formed of a plurality of strands 10 interwoven to form a mesh or screen 20.

In forming a silver anode for this screen, a silver oxide layer (not shown) is adhered to the screen 20 to form the active material for the silver zinc or like battery.

In the alkaline silver anode battery systems in which this invention is to be used the nickel used as the core material does not contaminate or deleteriously affect battery action of the system and is relatively inert in the alkaline solution. For this reason, the composite silver on nickel used therein does not in any way deleteriously affect the battery action. This is made possible by method of cladding the nickel with the silver. The silver layer 14 is metallurgically bonded at the molecular level to the nickel core 12 by a solid phase bonding process such as that disclosed in U.S. Patent No. 2,691,845 or U.S. Patent No. 2,753,623.

These methods of joining by use of solid phase bonding advantageously provide a bond between the two materials which is as strong as either of the members individually as is disclosed in the above patents. In addition, the solid phase bonding does not introduce a foreign material at the interface as would result frequently in other former techniques such as liquid phase bonding or with the use of an interliner layer such as a solder or the like. Thus, processes such as brazing using a brazing alloy of copper or copper bearing material which would contaminate the battery are not desired.

Thus the advantage of the silver support in the silver zinc, silver cadmium or like systems of good adhesion for the silver oxide active material used in the anode is achieved in composite strand 10 and screen 20.

Further, the inertness and lack of deleterious contamination of the battery system is achieved while the nickel core provides an increase in strength in the order of threefold.

Finally, a much lower cost is permitted by the use of the nickel core.

Strands 10 may be in the range of from 0.005 inch to 0.250 inch in diameter while the silver may be in the range of from 5% to 50% by weight of the strand material itself. A typical screen support is in the form of a 20 x 20 mesh which is 20 strands to the inch each strand being 0.007 inch in diameter and contains 15 to 17% by weight of silver.

Thus it can be seen that an improved support for a silver oxide anode has been achieved in which much lower cost is achieved over solid silver and with an increase in strength while achieving good adhering qualities for the silver oxide material without deleterious contamination of the battery system.

In view of the above, it will be seen that the several objects of the invention are achieved and other advantageous results are obtained.

As many changes could be made in the above constructions without departing from the scope of the invention, it is intended that all matter contained in the above description or shown in the accompanying drawings shall be interpreted as illustrative and not in a limiting sense, and it is also intended that the appended claims shall cover all such equivalent variations as come within the true spirit and scope of the invention.

It is to be understood that the invention is not limited in its application to the details of construction and ar-

I claim:

1. A silver-zinc or silver-cadminum type battery, comprising, as an element thereof an electrode formed of a wire-mesh screen of a plurality of strand-like members each of which is formed of an inner core of nickel and an outer layer of silver metallurgically bonded to the nickel core and a layer of silver oxide material adhered to the support.

2. A battery as set forth in claim 1 wherein the strand like member is in the range of from 0.005 to .25 inch in diameter.

3. A battery as set forth in claim 1 wherein the silver is in the range of from about 5% to about 50% by weight of the composed strand.

References Cited

UNITED STATES PATENTS

| | | | |
|---|---|---|---|
| 3,300,343 | 1/1967 | Huber et al. | 136—86 |
| 3,305,401 | 2/1967 | Aulin | 136—120 |
| 3,317,350 | 5/1967 | Murphy | 136—100 |

WINSTON A. DOUGLAS, *Primary Examiner.*

A. SKAPARS, *Assistant Examiner.*

U.S. Cl. X.R.

136—24, 30, 120